United States Patent [19]

Mizuno

[11] Patent Number: 5,206,725
[45] Date of Patent: Apr. 27, 1993

[54] METHOD AND APPARATUS FOR CODING/DECODING IMAGE SIGNAL PROVIDING ACCURATE DETERMINATION OF AN IMAGE CONTOUR AND EFFICIENT COMPRESSION CODING

[75] Inventor: Shoji Mizuno, Tokyo, Japan

[73] Assignee: NEC Corporation, Tokyo, Japan

[21] Appl. No.: 791,150

[22] Filed: Nov. 13, 1991

[30] Foreign Application Priority Data

Nov. 13, 1990 [JP] Japan ............................. 2-306479

[51] Int. Cl.$^5$ ............................................. H04N 7/12
[52] U.S. Cl. ................................... 358/133; 358/426
[58] Field of Search .............. 358/133, 135, 136, 141, 358/426, 433

[56] References Cited

U.S. PATENT DOCUMENTS

| | | | |
|---|---|---|---|
| 4,745,473 | 5/1988 | Hall | 358/133 |
| 4,802,003 | 1/1989 | Takei et al. | 358/133 |
| 4,873,577 | 10/1989 | Chamzas | 358/133 X |
| 5,105,271 | 4/1992 | Niihara | 358/135 X |

OTHER PUBLICATIONS

Peter Pirsch et al., "Statistical analysis and coding of color video signals", ACTA Electronica, 19, 4, 1976, pp. 277-287.

Willmut Zschunke, "DPCM Picture Coding with Adaptive Prediction", IEEE Transactions on Communications, vol. COM-25, No. 11, Nov. 1977 pp. 1295-1302.

Shoji Mizuno, "Ordering Predictive Coding for Multi-level Picture Signal" The Transactions of The Institute of Electronics, Information and Communication Engineers B-I vol. J73-B-I No. 6 pp. 554-560, Jun. 1990.

Shigeo Kato et al., "An Efficient Coding For Multi--Level Facsimile Images with Arithmetic Coding", The Journal of The Institute of Image Electronics Engineers of Japan, vol. 12 No. 3, 1983, pp. 219-226.

*Primary Examiner*—Victor R. Kostak
*Attorney, Agent, or Firm*—Sughrue, Mion, Zinn, Macpeak & Seas

[57] ABSTRACT

On the coding side of the apparatus, an image signal is divided into an upper signal for coarsely designating a level of the image signal and a lower signal for finely designating the level of the image signal. The upper signal is then coded. A reference signal for coding the lower signal is selected. The lower signal is coded by referring to the selected reference signal. The coded upper and the lower signals are synthesized, and the synthesized code is output as a code corresponding to the image signal. On the decoding side of the apparatus, the synthesized code is decoded into a code corresponding to the upper signal and a code corresponding to the lower signal. The code corresponding to the upper signal is decoded into an upper signal. A reference signal for decoding the code corresponding to the lower signal is selected. The code corresponding to the lower signal is decoded into a lower signal by referring to the selected signal. The decoded upper and lower signals are synthesized to obtain the image signal.

16 Claims, 6 Drawing Sheets

METHOD AND APPARATUS FOR CODING/DECODING IMAGE SIGNAL PROVIDING ACCURATE DETERMINATION OF AN IMAGE CONTOUR AND EFFICIENT COMPRESSION CODING

BACKGROUND OF THE INVENTION

The present invention relates to a method and apparatus for coding/decoding an image signal to reduce the data amount of an image signal so as to transmit or file it.

In a conventional scheme for performing predictive coding of an image signal, a reference pixel is adaptively selected to improve coding efficiency, as disclosed in "DPCM picture coding with adaptive prediction", IEEE Trans. Commun. Vol. com-25, No. 11, Nov., 1977, pp. 1295-1302 (to be referred to "reference 1" hereinafter). In reference 1, a criterion for selecting a reference pixel is determined by checking level changes of coded image signals so that a reference pixel is selected to make an accurate prediction Assume that a pixel $x_0$ ("pixel" will be omitted hereinafter) is predicted in FIG. 2A. In this case, if the value of $|x_4-x_{10}|$ is 10% or less of the range of an image signal, $x_4$ is used for prediction. Otherwise, $|x_4-x_9|$, $|x_4-x_1|$, and $|x_4-x_2|$ are measured. If $|x_4-x_9|$ is the minimum value, $x_1$ is used for prediction on the assumption that there is a contour extending from upper left to lower right. If $|x_4-x_1|$ is the minimum value, $x_2$ is used for prediction on the assumption that there is a contour extending in the vertical direction. If $|x_4-x_2|$ is the minimum value, $x_3$ is used for prediction on the assumption that there is a contour extending from upper right to lower left. Another coding scheme is disclosed in "Image Signal Coding Apparatus", Japanese Patent Laid-Open No. 58-13071 (reference 2), in which coding is performed in such a manner that a signal (to be referred to as an upper signal hereinafter) for coarsely designating the level of an image signal is coded, and the level of the image signal is finely specified by using the coding result. FIG. 6 shows the arrangement of the apparatus in reference 2. A signal Sp output from a shift register 31 in FIG. 6 represents a pixel coded to the final level, which corresponds to $x_1$, $x_2$, $x_3$, and $x_4$ in FIG. 2A. A signal $S_{a1}$ output from a shift register 25 is an upper signal, which corresponds to $y_0$, $y_1$, $y_2$, $y_3$, $y_4$, $y_5$, $y_6$, $y_7$, and $y_8$ in FIG. 2B. Upper signals $y_0$ to $y_8$ corresponding to $x_0$ to $x_8$ in FIG. 2A. Assume that coding is currently performed to specify the final level of $x_0$. Referring to FIG. 6 corresponding to reference 2, an N-level image signal predictive coder 30 predicts an image signal x (corresponding to $x_0$ in FIG. 2A) on the basis of a coded upper signal $S_{a1}$ and a coded image signal Sp, and an N-level image signal compression coder 29 performs compression coding of a prediction error signal e. Referring to FIG. 6, reference numeral 24 denotes an $N_1$-level conversion circuit; 26, an $N_1$-level signal predictive coder; 27, an $N_1$-level signal compression coder; and 28, a selection circuit.

In the conventional scheme in reference 1, since signals $x_0$, $x_5$, $x_6$, $x_7$, and $x_8$, which are not coded yet, cannot be used to check a contour direction, determination of a contour becomes inaccurate, and the coding efficiency is degraded. In reference 2, compression coding of an image signal can be performed with high efficiency by using not only the coded image signal Sp but also the coded upper signal $S_{a1}$. However, since the coded upper signal $S_{a1}$ is constituted by a large number of pixels, complicated hardware is required.

SUMMARY OF THE INVENTION

It is an object of the present invention to provide a method of coding/decoding an image signal, which allows accurate determination of an image contour, and can improve coding efficiency.

It is another object of the present invention to provide an apparatus for coding/decoding an image signal, which can perform compression coding of an image signal with high efficiency without using any complicated hardware.

In order to achieve the above objects, according to the present invention, there is provided a method of coding/decoding an image signal, comprising the coding and decoding steps, the coding steps comprising dividing an image signal into an upper signal for coarsely designating a level of the image signal and a lower signal for finely designating the level of the image signal, coding the upper signal, selecting a reference signal for coding the lower signal, coding the lower signal by referring to the selected reference signal, and synthesizing the coded upper signal and the coded lower signal and outputting a code corresponding to the image signal, and the decoding steps comprising dividing the synthesized code into a code corresponding to the upper signal and a code corresponding to the lower signal, decoding the code corresponding to the upper signal into an upper signal, selecting a reference signal for decoding the code corresponding to the lower signal, decoding the code corresponding to the lower signal into a lower signal by referring to the selected signal, and synthesizing the decoded upper and lower signals to obtain the image signal.

In addition, according to the present invention, there is provided an apparatus for coding an image signal, comprising means for dividing an image signal into an upper signal for coarsely designating a level of the image signal and a lower signal for finely designating the level of the image signal, means for coding the upper signal, means for selecting a reference signal for coding the lower signal, means for coding the lower signal by referring to the selected reference signal, and means for synthesizing the coded upper signal and the coded lower signal and outputting a code corresponding to the image signal.

Furthermore, according to the present invention, there is provided an apparatus for decoding an image signal, comprising means for dividing a synthesized code into a code corresponding to an upper signal for coarsely designating a level of an image signal and a code corresponding to a lower signal for finely designating the level of the image signal, means for decoding the code corresponding to the upper signal into the upper signal, means for selecting a reference signal for decoding the code corresponding to the lower signal, means for decoding the code corresponding to the lower signal into the lower signal by referring to the selected signal, and means for synthesizing the decoded upper and lower signals to obtain the image signal.

DESCRIPTION OF THE PREFERRED EMBODIMENT

Figure 1:
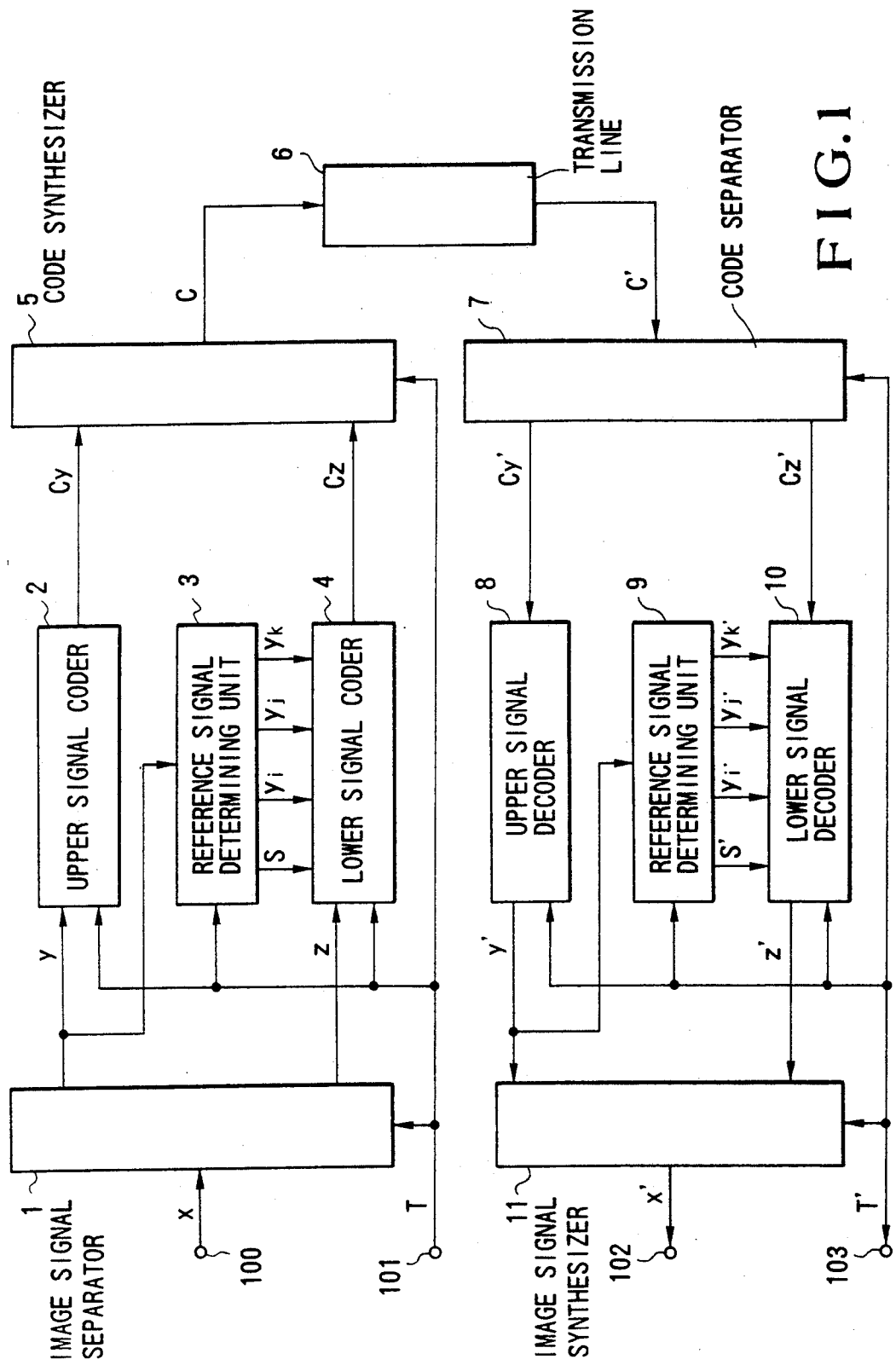
FIG. 1 i a block diagram showing a coding/decoding apparatus of the present invention.
Figures 2A, 2B:
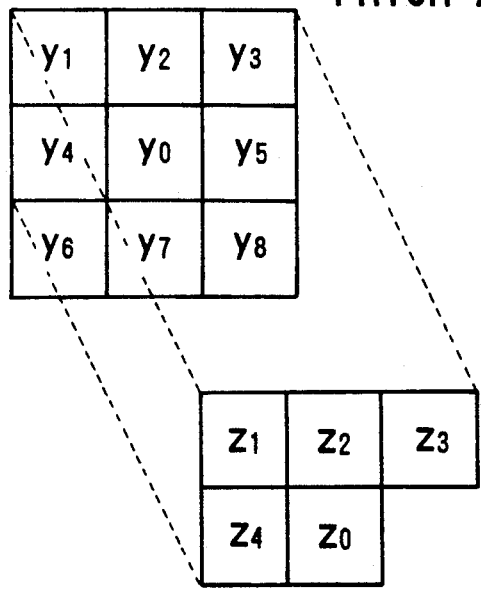
FIGS. 2A and 2B are views respectively showing an image signal and the positional relationship between the upper and lower signals of the image signal.

FIG. 1 shows a coding apparatus and a decoding apparatus according to the present invention. Referring to FIG. 1, an image signal x is input through a terminal 100 to be supplied to an image signal separator 1. The image signal separator 1 separates the image signal x into an upper signal y for coarsely designating the level of the image signal x and a lower signal z for finely designating the level of the image signal x. If, for example, the image signal x is a 6-bit/pixel signal, the upper 3 bits and the lower 3 bits can be respectively assigned to the upper and lower signals y and z. Although this case will be exemplified below, various combinations of upper and lower signals can be employed. For example, if the image signal x is a 6-bit/pixel signal, the upper 4 bits and the lower 2 bits may be assigned to the upper and lower signals y and z, respectively. The upper signal is subjected to compression coding in an upper signal coder 2 and is supplied, as a compressed code Cy, to a code synthesizer 5. For example, the upper signal coder 2 may employ the scheme disclosed in Shoji MIZUNO, "Ordering Predictive Coding for Multilevel Picture Signal", THE TRANSACTIONS OF THE INSTITUTE OF ELECTRONICS, INFORMATION AND COMMUNICATION ENGINEERS (reference 3), or Shigeo KATO, Yasuhiko YASUDA, "An Efficient Coding for Multi-level Facsimile Images with Arithmetic Coding", THE JOURNAL OF THE INSTITUTE OF IMAGE ELECTRONICS ENGINEERS OF JAPAN (reference 4), or reference 1. A reference signal determining unit 3 detects the contour direction of the image by using the upper signal y, determines a reference signal used for coding the lower signal z, and supplies a direction code S and reference signals $y_i$, $y_j$, and $y_k$ to a lower signal coder 4. The direction code S represents a contour direction with respect to a lower signal which is currently coded. The reference signals $y_i$, $y_j$, and $y_k$ will be described below with reference to FIG. 2B. Referring to FIG. 2B, reference symbols $y_0$ to $y_8$ denote upper signals corresponding to $x_0$ to $x_8$ in FIG. 2A; and $z_0$ to $z_4$, lower signals corresponding to $x_0$ to $x_4$ in FIG. 2A. When a contour extends from upper left to lower right, the reference signals $y_i$, $y_j$, and $y_k$ are represented by $y_1$, $y_0$, and $y_8$. When a contour vertically extends downward, the reference signals are represented by $y_2$, $y_0$, and $y_7$. When a contour extends from upper right to lower left, the reference signals are represented by $y_3$, $y_0$, and $y_6$. When a contour extends horizontally, the reference signals are represented by $y_4$, $y_0$, and $y_5$. For example, a contour direction is detected by the following method. First, the following formulae (1), (2), (3), and (4) are calculated:

$$|y_1-y_0|+|y_0-y_8| \quad (1)$$

$$|y_2-y_0|+|y_0-y_7| \quad (2)$$

$$|y_3-y_0|+|y_0-y_6| \quad (3)$$

$$|y_4-y_0|+|y_0-y_5| \quad (4)$$

When formula (1) is the minimum value, it is determined that a contour extends from upper left to lower right. When formula (2) is the minimum value, it is determined that a contour vertically extends downward. When formula (3) is the minimum value, a contour extends from upper right to lower left. When formula (4) is the minimum value, it is determined that a contour extends horizontally. The lower signal coder 4 selects a coded lower signal $z_l$ to be referred to on the basis of the direction code S, and obtains a code Cz by coding the lower signal z by referring to the reference signals $y_i$, $y_j$, $y_k$, and $z_l$. As the lower signal $z_l$, for example, $z_1$ is selected when a contour extends from upper left to lower right, $z_2$ is selected when a contour vertically extends downward, $z_3$ is selected when a contour extends from upper right to lower left, and $z_4$ is selected when a contour extends horizontally. As is apparent from the above description, when the lower signal $z_0$ in FIG. 2B is to be coded, the contour direction can be determined by using an upper signal at the same position as that of the lower signal $z_0$ or a lower right position, thus allowing more accurate determination of the contour direction than the scheme in reference 1. The code synthesizer 5 selects the codes Cy and Cz in this order to synthesize them, and outputs the result, as a code C, to a transmission line 6. An initialization signal and a timing signal T such as a clock are supplied through a terminal 101 to be used to control the respective components.

Figure 3:
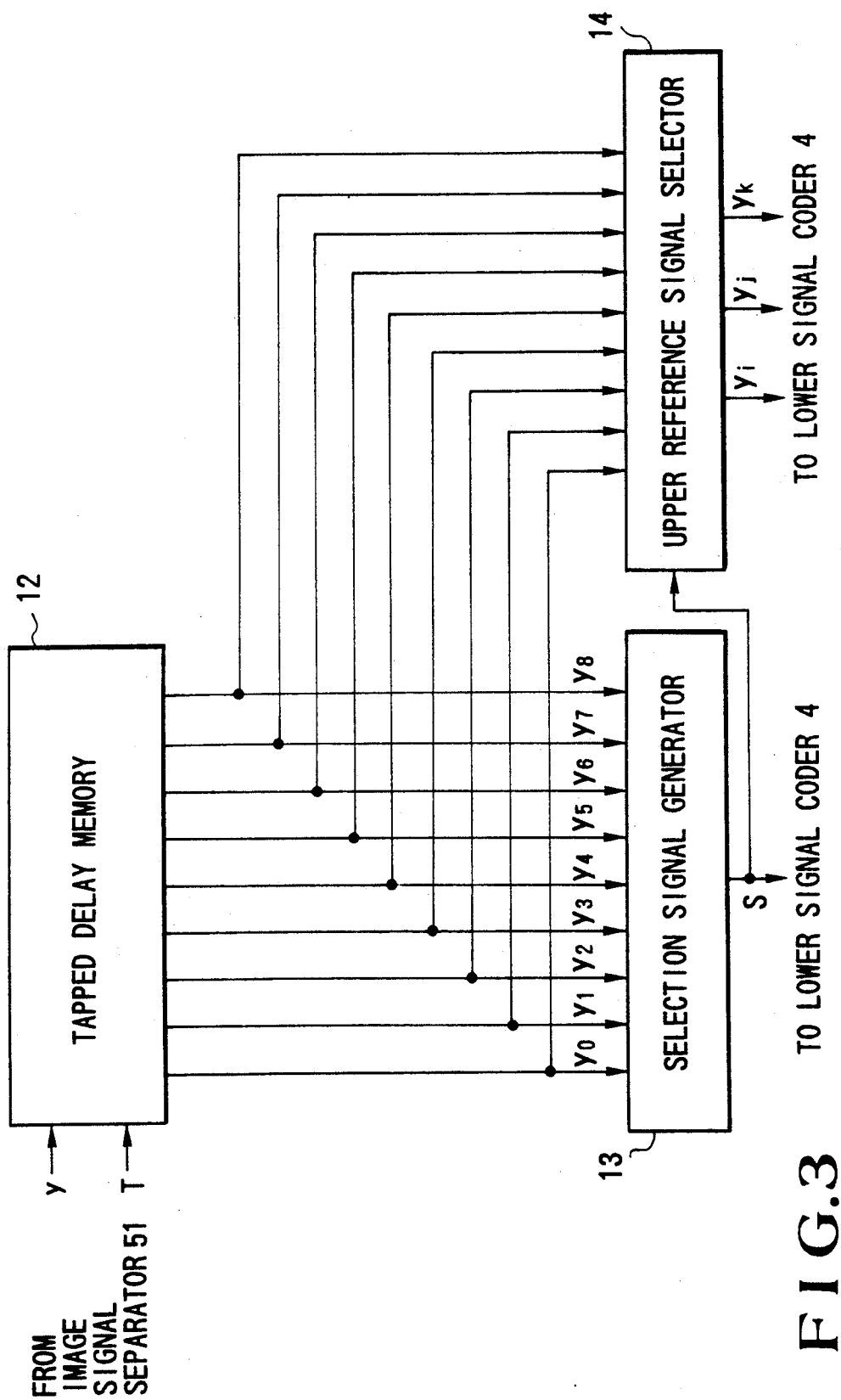
FIG. 3 is a block diagram showing a reference signal determining unit in FIG. 1.

FIG. 3 shows the arrangement of the reference signal determining unit 3. A tapped delay memory 12 receives the upper signal y, and delays the signal in accordance with the timing signal T to output the signals $y_0$ to $y_8$ in FIG. 2B to a selection signal generator 13 and an upper reference signal selector 14. The selection signal generator 13 calculates the absolute difference sums of formulae (1) to (4) and generates the direction code S which is set at level 1 when formula (1) is the minimum value, is set at level 2 when formula (2) is the minimum value, is set at level 3 when formula (3) is the minimum value, and is set at level 4 when formula (4) is the minimum value. The selection signal generator 13 supplies the direction code S to the upper reference signal selector 14 and the lower signal coder 4 in FIG. 1. The upper reference signal selector 14 selects three signals from the upper signals $y_0$ to $y_8$ on the basis of the direction code S and

TABLE 1

The lower reference signal z will be described later.

| Direction code S | Upper reference signals $y_i$, $y_j$, $y_k$ | Lower reference signal z |
|---|---|---|
| 1 | $y_1$, $y_0$, $y_8$ | $z_1$ |
| 2 | $y_2$, $y_0$, $y_7$ | $z_2$ |
| 3 | $y_3$, $y_0$, $y_6$ | $z_3$ |
| 4 | $y_4$, $y_0$, $y_5$ | $z_4$ |

Figure 4:
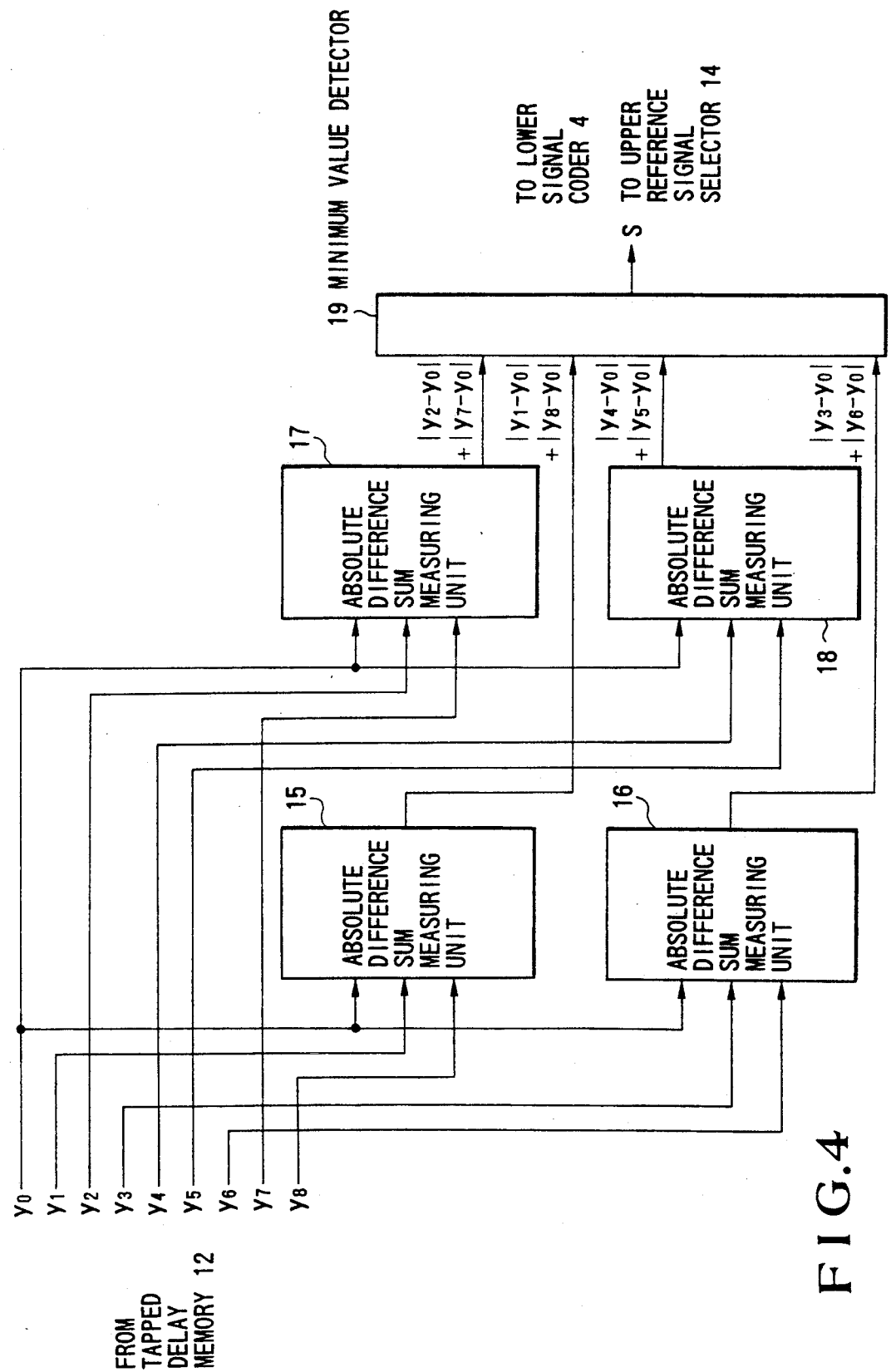
FIG. 4 is a block diagram showing a selection signal generator in FIG. 3.

FIG. 4 shows the arrangement of the selection signal generator 13 in FIG. 3. Absolute difference sum measuring units 15 to 18 respectively calculate the absolute difference sums of formulae (1) to (4) and supply them to a minimum value detector 19. The minimum value detector 19 determines which one of formulae (1) to (4) is the minimum value, and generates the direction code S represented by S=1 when formula (1) is the minimum value; S=2 when formula (2) is the minimum value; S=3 when formula (3) is the minimum; and S=3 when formula (4) is the minimum value.

Figure 5:
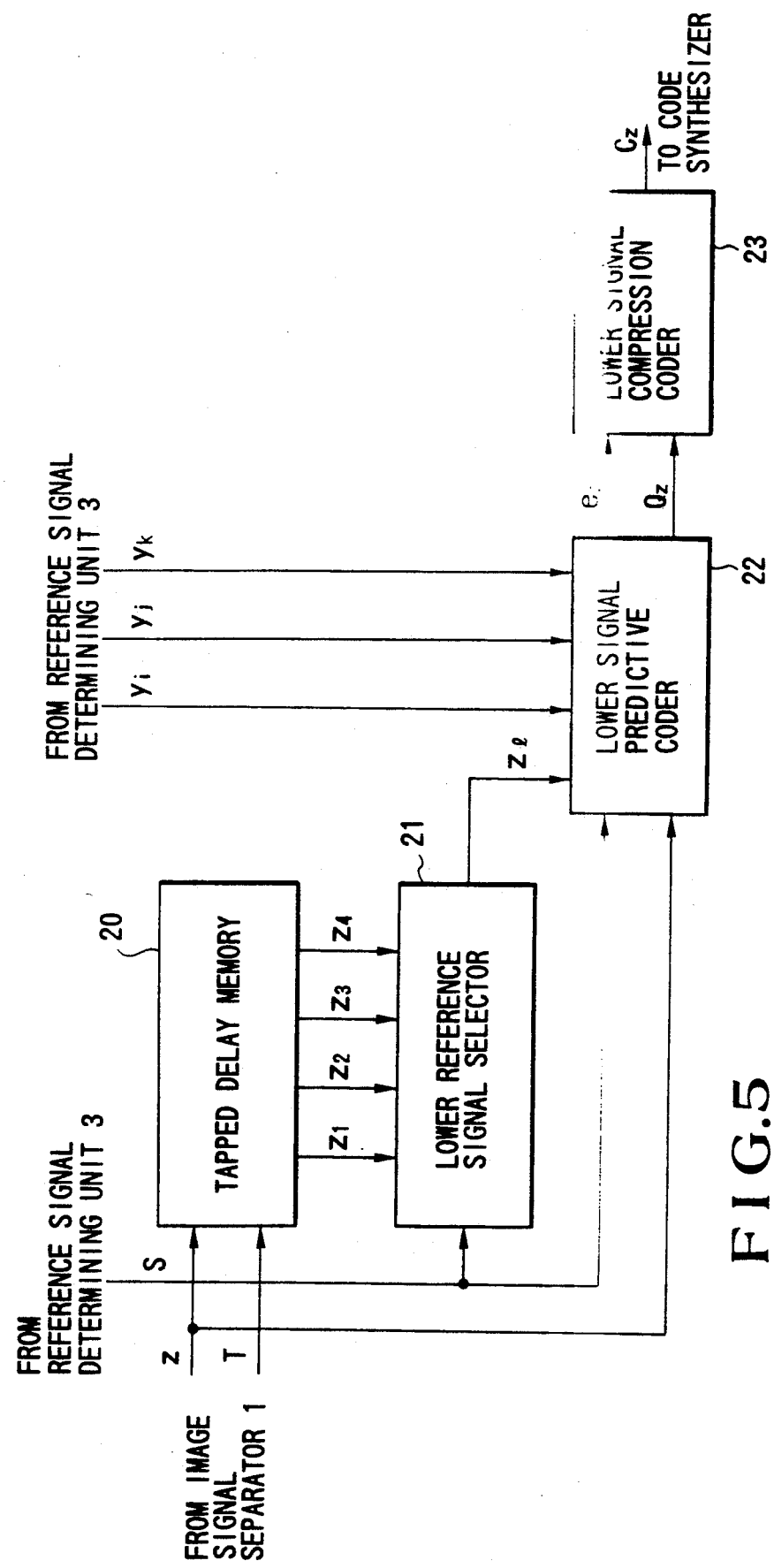
FIG. 5 is a block diagram showing a lower signal coder in FIG. 1.
Figure 6:
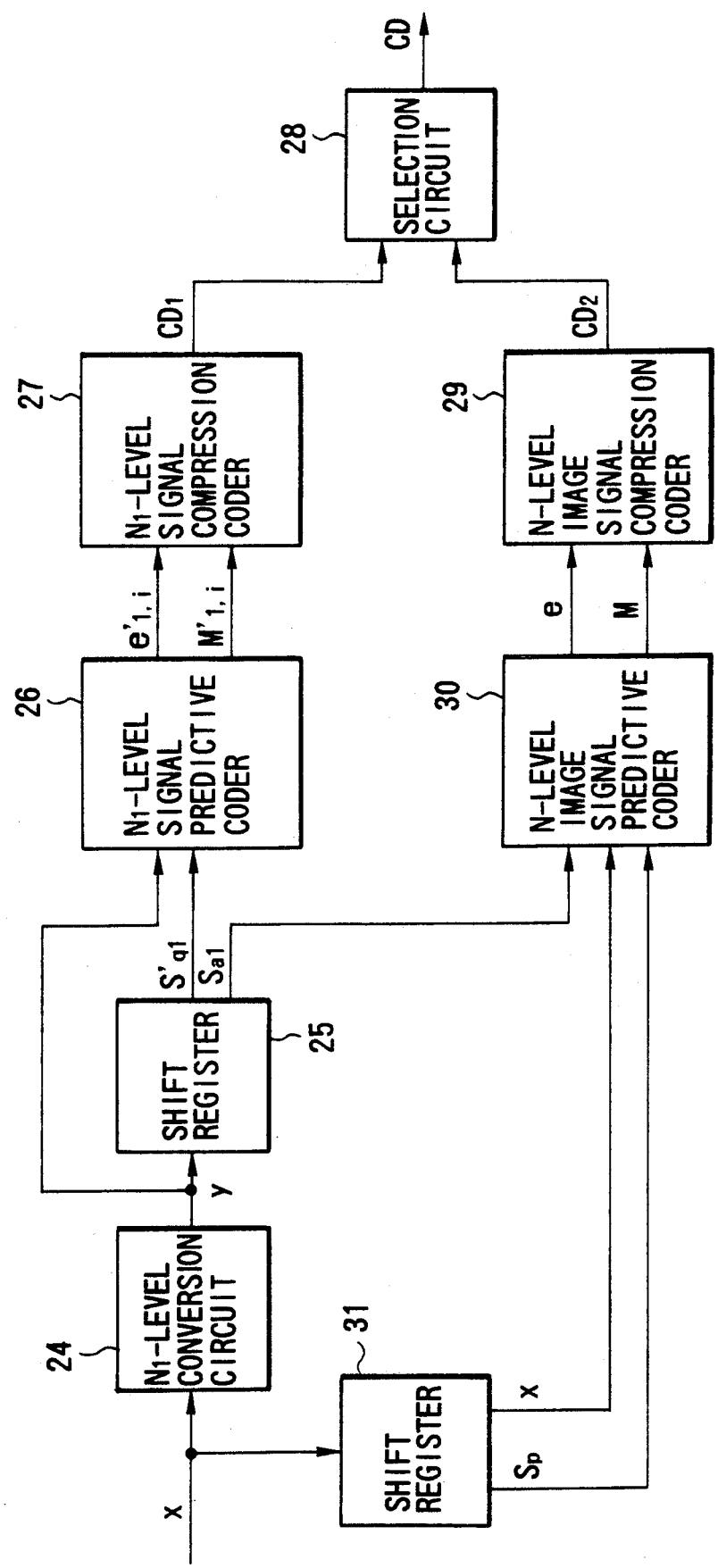
FIG. 6 is a block diagram showing a conventional coding apparatus.

FIG. 5 shows the arrangement of the lower signal coder 4 in FIG. 1. The tapped delay memory 20 receives the lower signal z and delays it in accordance with the timing signal T to output the signals $z_1$ to $z_4$ in FIG. 2B to the lower reference signal selector 21. The lower reference signal selector 21 selects one of the lower signals $z_1$ to $z_4$ on the basis of the direction code S and Table 1, and outputs the selected signal as the lower reference signal $z_l$.

A lower signal predictive coder 22 predicts the lower signal z (corresponding to $z_0$ in FIG. 2B) on the basis of the direction code lower reference signal $z_l$ and the upper reference signals $y_i$, $y_j$, and $y_k$, and outputs a predictive conversion signal $e_z$ as an ordering prediction signal representing a corresponding prediction error signal or the probability order of the signal z together with a predictive state signal $Q_z$. The ordering prediction signal is described in detail in reference 3. The predictive conversion signal $e_z$ is subjected to compression coding in a lower signal compression coder 23 by Huffman coding, run length coding, or arithmetic coding, using the predictive state signal $Q_z$. When the predictive conversion signal $e_z$ is to be processed by ordering predictive coding as disclosed in reference 3, the predictive state signal $Q_z$ serves as a signal indicating the probability that each bit of the ordering prediction signal is expressed by "1" in binary notation. In this case, the predictive conversion signal $e_z$ is expressed in binary notation, and the respective bits are divided into groups on the basis of the predictive state signal $Q_z$ to be subjected to run length coding. When the predictive conversion signal $e_z$ is to be processed by arithmetic coding as disclosed in reference 4, the predictive state signal $Q_z$ serves as a signal approximately indicating the probability of the predictive conversion signal $e_z$. When the predictive conversion signal $e_z$ is to be processed by Huffman coding, the predictive state signal $Q_z$ also serves as a signal approximately indicating the probability of the predictive conversion signal $e_z$. In this manner, a code table for coding the predictive conversion signal $e_z$ can be adaptively changed in accordance with the predictive state signal $Q_z$.

Referring to FIG. 1 again, on the decoding side, a code separator 7 receives a compressed code C' through the transmission line 6 and separates it into a code Cy' corresponding to the upper signal and a code Cz' corresponding to the lower signal. The code separator 7 then outputs the codes to an upper signal decoder 8 and a lower signal decoder 10, respectively. The upper and lower signal decoders 8 and 10 respectively perform reverse processes to those performed by the upper and lower coders 2 and 4 to obtain upper and lower signals y' and z', and output them to an image signal synthesizer 11. The lower signal decoder 10 receives a direction code S' and upper reference signals $y_i'$, $y_j'$, and $y_k'$ from a reference signal determining unit 9, and performs a decoding operation. The reference signal determining unit 9 has the same arrangement as that of the reference signal determining unit 3. The image signal synthesizer 11 synthesizes the upper and lower signals y' and z' to obtain an image signal x', and outputs it to a terminal 102. An initialization signal and a timing signal T' such as a clock are supplied through a terminal 103 to be used to control the respective components.

As has been described above, according to the present invention, an image signal is divided into an upper signal for coarsely designating the level of the image signal and a lower signal for finely designating the level of the image signal. The contour direction of an image is more accurately determined by the upper signal, and a reference signal used for prediction of the lower signal is adaptively selected, thus improving the coding efficiency without complicating the hardware.

What is claimed is:

1. A method of coding an image signal, comprising the steps of:
    dividing an image signal into an upper signal for coarsely designating a level of the image signal and a lower signal for finely designating the level of the image signal;
    coding the upper signal;
    detecting a contour direction of an image from said upper signal;
    selecting a reference signal for coding the lower signal in accordance with a direction code indicating the contour direction;
    coding the lower signal by referring to the selected reference signal; and
    synthesizing the coded upper signal and the coded lower signal and outputting a code corresponding to the image signal.

2. A method according to claim 1, wherein the reference signal is constituted by upper reference signals selected by the direction code, and a lower reference signal.

3. A method according to claim 2, wherein the direction code is determined by a minimum value of absolute difference sums calculated in units of directions represented by upper signals.

4. A method according to claim 2, wherein a plurality of upper reference signals are selected as the upper reference signals from a plurality of upper signals in accordance with a contour direction;

5. A method according to claim 2, wherein one lower reference signal is selected as the lower reference signal from a plurality of coded lower signals in accordance with a contour direction.

6. A method according to claim 1, wherein coding of the lower signal is performed by performing compression coding of a predictive conversion signal as an ordering prediction signal representing a predictive error of the predicted lower signal or a probability order thereof by using a predictive state signal.

7. A method of coding/decoding an image signal, comprising coding and decoding steps, said coding steps comprising the steps of:
    dividing an image signal into an upper signal for coarsely designating a level of the image signal and a lower signal for finely designating the level of the image signal;
    coding the upper signal;
    detecting a contour direction of an image from said upper signal;
    selecting a reference signal for coding the lower signal in accordance with a direction code indicating the contour direction;
    coding the lower signal by referring to the selected reference signal; and
    synthesizing the coded upper signal and the coded lower signal and outputting a code corresponding to the image signal,
    said decoding steps comprising the steps of:

dividing the synthesized code into a code corresponding to the upper signal and a code corresponding to the lower signal;

decoding the code corresponding to the upper signal into an upper signal;

detecting a contour direction of an image from said upper signal;

selecting a reference signal for decoding the code corresponding to the lower signal in accordance with said direction code indicating the contour direction;

decoding the code corresponding to the lower signal into a lower signal by referring to the selected signal; and synthesizing the decoded upper and lower signals to obtain the image signal.

8. An apparatus for coding an image signal, comprising:

means for dividing an image signal into an upper signal for coarsely designating a level of the image signal and a lower signal for finely designating the level of the image signal;

means for coding the upper signal;

means for detecting a contour direction of an image signal from said upper signal;

means for selecting a reference signal for coding the lower signal in accordance with a direction code indicating the contour direction;

means for coding the lower signal by referring to the selected reference signal; and means for synthesizing the coded upper signal and the coded lower signal and outputting a code corresponding to the image signal.

9. An apparatus according to claim 8, wherein said means for selecting the reference signal comprises first selecting means for selecting an upper reference signal from a plurality of upper signals in accordance with the direction code, and second selecting means for selecting a lower reference signal from a plurality of coded lower signals.

10. An apparatus according to claim 9, further comprising means for determining the direction code on the basis of a minimum value of absolute difference sums calculated in units of directions represented by the upper signals.

11. An apparatus according to claim 10, wherein said means for determining the direction code comprises a plurality of absolute difference sum measuring units for calculating the absolute difference sums in units of directions, and a minimum value detector for detecting a minimum value of values measured by said absolute difference sum measuring units.

12. An apparatus according to claim 9, wherein said first selecting means selects a plurality of upper reference signals from the plurality of upper signals in accordance with the contour direction.

13. An apparatus according to claim 9, wherein said second selecting means selects one lower reference signal from the plurality of coded lower signals in accordance with the contour direction.

14. An apparatus according to claim 8, wherein said means for coding the lower signal comprises means for outputting a predictive conversion signal as an ordering prediction signal representing a predictive error of a predicted lower signal or a probability order thereof, and a predictive state signal, and means for performing compression coding of the predictive conversion signal by using the predictive state signal.

15. An apparatus for decoding an image signal, comprising:

means for dividing a synthesized coded into a code corresponding to an upper signal for coarsely designating a level of an image signal and a code corresponding to a lower signal for finely designating the level of the image signal;

means for decoding the code corresponding to the upper signal into the upper signal;

means for detecting a contour direction of an image from said upper signal;

means for selecting a reference signal for decoding the code corresponding to the lower signal in accordance with a direction code indicating the contour direction;

means for decoding the code corresponding to the lower signal into the lower signal by referring to the selected signal; and means for synthesizing the decoded upper and lower signals to obtain the image signal.

16. An apparatus according to claim 15, wherein said means for selecting the reference signal outputs a direction code indicating a contour direction and a plurality of upper reference signals to said means for decoding the lower signal.

* * * * *

UNITED STATES PATENT AND TRADEMARK OFFICE
CERTIFICATE OF CORRECTION

PATENT NO. : 5,206,725
DATED : Apr. 27, 1993
INVENTOR(S) : Shoji MIZUNO It is certified that error appears in the above-identified patent and that said Letters Patent is hereby corrected as shown below:

Col. 4,  line 56,  delete "z" and insert $--z_\ell--$.

Col. 5,  line 13,  delete "$z_1$" and insert $--z_\ell--$.

Signed and Sealed this

Eleventh Day of January, 1994

Attest:

BRUCE LEHMAN

*Attesting Officer*    *Commissioner of Patents and Trademarks*